United States Patent [19]
Harvey et al.

[11] Patent Number: 5,999,491
[45] Date of Patent: Dec. 7, 1999

[54] LOW FREQUENCY UNDERWATER SOUND SOURCE

[75] Inventors: Leslie G Harvey, Poole; Jeremy R Nedwell, Bishop's Waltham, both of United Kingdom

[73] Assignee: The Secretary of State for Defence in Her Britannic Majesty's Government of the United Kingdom of Great Britain and Northern Ireland, Farnborough, United Kingdom

[21] Appl. No.: 09/077,522

[22] PCT Filed: Nov. 29, 1996

[86] PCT No.: PCT/GB96/02951

§ 371 Date: Sep. 8, 1998

§ 102(e) Date: Sep. 8, 1998

[87] PCT Pub. No.: WO97/20233

PCT Pub. Date: Jun. 5, 1997

[30] Foreign Application Priority Data

Nov. 30, 1995 [GB] United Kingdom .................... 9524471

[51] Int. Cl.⁶ ............... G01V 1/02; G10K 11/18

[52] U.S. Cl. .................................... 367/144; 367/1
[58] Field of Search ................... 367/144, 92, 1

[56] References Cited

U.S. PATENT DOCUMENTS

| | | |
|---|---|---|
| 3,177,466 | 4/1965 | Arnoldi ........................................ 367/1 |
| 3,437,170 | 4/1969 | Brock et al. . |
| 3,493,072 | 2/1970 | Johnston . |

OTHER PUBLICATIONS

Patent Abstracts of Japan vol. 95, No. 008 & JP 07 203579 A (Mitsubishi Heavy Ind Ltd), Aug. 4, 1995, see abstract.

Primary Examiner—Daniel T. Pihulic
Attorney, Agent, or Firm—Nixon & Vanderhye P.C.

[57] ABSTRACT

An acoustic generating system is described incorporating a bubble generator (1) for forming pressurised gas bubbles and directing the bubbles in a plume from an outlet (7), and a low frequency sound source (2) to apply a varying pressure to the base of the plume of bubbles to modulate (8) the plume of bubbles, whereby a source of low frequency sound waves is produced. A method for generating and transmitting a low frequency acoustic wave using is also described.

18 Claims, 5 Drawing Sheets

(PROPORTION OF AIR IN MIXTURE, BY VOLUME)

LOW FREQUENCY UNDERWATER SOUND SOURCE

BACKGROUND OF THE INVENTION

1. Field of the Invention

The present invention relates to devices for the production of sound and in particular to the production of sound of low frequencies in underwater applications.

2. Discussion of the Prior Art

Considerable effort has been expended in reducing the operating frequency of transducers that are used in underwater communication, sonar and other instrumentation. Whereas it is relatively straightforward to measure and record low frequency sound, such sound generation is more difficult. The current generation of low frequency transducers is generally based on piezoelectric or magnetostrictive materials operating within a flextensional capsule which increases the displacement of water produced by the device and hence renders its operation more efficient. However these transducers suffer from the disadvantage that to retain a given degree of efficiency in operation, their size must increase as the inverse of the operating frequency. Size, weight and cost considerations therefore limit the lower usable frequency of existing transducers to 200 Hz or so. Also the device becomes increasingly resonant as frequency decreases thereby limiting the frequency range over which it can be used.

U.S. Pat. No. 3,437,170 discloses acoustic generators which release bubbles underwater from a number of chambers having different volumes for producing waves having predetermined energy spectra. Also U.S. Pat. No. 3,493,072 discloses an acoustic generator for marine seismic exploration in which pressurised gas is released from an underwater chamber impulsively to create air bubbles having varying fundamental frequencies.

SUMMARY OF THE INVENTION

The present invention is directed towards an improved low frequency acoustic generating system which is capable of overcoming certain disadvantages of prior art systems.

Thus according to the present invention an acoustic generating system comprises bubble generation means for forming pressurised gas bubbles, means for directing the bubbles in a plume from an outlet, and means for applying a varying pressure to the base of the plume of bubbles for modulating the plume of bubbles, the means for applying a varying pressure comprising a low frequency sound source whereby a source of low frequency sound waves is produced and preferably being located adjacent to the outlet. In use, the outlet of the acoustic generating system is preferably immersed in a liquid medium such as sea water.

According to a further aspect of the invention, there is provided a method emitting sound of a known low frequency by use of an acoustic generating system as hereinbefore described.

It has been found that plumes of bubbles in water possess an unusual acoustic property, namely that of directing sound. Small proportions of air in water (as bubbles), typically tenths or hundredths of a percent, make substantial changes to the sound velocity. The presence of air bubbles in larger proportions further decreases the sound speed, to a minimum of about 35 ms$^{-1}$ for a few percent of air. In a bubble plume, the highest concentration of air is found along the flow axis and hence sound is trapped within the plume by diffraction towards the sound speed minimum. In addition, the acoustic impedance of the plume varies continuously along its length from a very low value at its point of formation to a high value at the point where the bubbles are dispersed or absorbed into the water. This leads to the situation in which small pressure changes caused by changes in air volume at the point of plume formation can produce large pressure changes (albeit associated with small changes in volume) at the end of the plume and ultimately in the surrounding fluid. The effect which is achieved by pulsing the air supply to the plume is very similar to that of an acoustic horn or loud-hailer in air. Thus the possibility exists of making use of a small source which is required to generate bubbles only and utilising volume changes in the neck of the plume to generate high levels of low frequency sound.

The invention applies these properties of plumes to produce improved low-frequency transducers for use in denser fluids such as underwater. In a low density medium such as air small forces are required to generate large sound displacements and generating devices, such as loudspeakers, incorporate large displacements of a flexible system. In denser media larger forces are required to generate small displacements and devices tend to be based on piezoelectric elements which are very stiff. Additionally, for efficient and broadband generation of sound, the active area of the device must typically be large relative to wavelength. In water at a frequency of 100 Hz the wavelength is 15 meters. Hence existing transducers at these frequencies tend to be resonant and inefficient. The invention provides an efficient, broadband sound generator at lower frequencies which is of a much more manageable and practical size than would be necessary to overcome the above problems in a conventional transducer. Transducers operating below 100 Hz under water are thus made a practical proposition.

This utilisation of the properties of a bubble plume in this way differs greatly from other sources of sound underwater using air or gas such as are described in the above mentioned US patens. There are devices available which use compressed gas to generate a sudden expansion of a bubble or bubbles. These devices however are impulsive, resonant and make no use of the properties of bubbles to transform impedance. The device described herein can transmit sound continuously, and can operate over a wide range of frequencies.

An acoustic generating system according to the present invention may be used as a low frequency sound source for a range of applications such as depth sounding, telecommunications, fish finding e.g. for spotting schools of fish. Also the systems may have military or naval uses e.g. mine-sweeping, submarine detection etc. The attenuation of sound in water at low frequencies is small and allows the possibility of signalling over large distances using devices in accordance with the invention.

The formation of the gas bubbles is preferably achieved by way of introduction of a pressurised gas to the chamber, the gas being released from the outlet in pulses or bubbles of a predetermined size and speed. The bubble generation means thus preferably comprises means for the introduction of a pressurised gas to the chamber, and means to control release of the gas from the outlet in pulses or bubbles of a predetermined size and speed. The pulses may be obtained by a suitable interrupter device such as a valve or rotating sectored disc or the like. Thus sound is generated by the release of compressed gas through a valve or equivalent which operates at the required frequency. The bubble plume which forms provides a mechanism for channelling the sound and acts to permit the transfer of sound energy from air to the liquid phase such as water.

The means for modulating the bubbles is a low frequency sound source having a frequency range preferably of the order 5–1000 Hz, more preferably 20–1000 Hz and may be for example a loudspeaker, foghorn or the like. The invention offers particular advantages where the sound source has a frequency range below 200 Hz, the effective practical limit for prior art devices, with frequencies below 100 Hz offering particular advantages of low attenuation over long distances under water. The invention is thus especially appropriate to use in a low frequency sound transmitter for the generation of long range signals underwater, for example for long range sonar or communications applications.

An alternative aspect of the invention based on a different feature of bubble clouds employing the same general underlying principles may be suggested for shallow water application. Where the height of the plume is terminated, as in shallow water, waves induced into the plume will travel along the plume and will be reflected both at the water surface and at the point that the plume is generated. This will lead to a resonant behavior of the plume, that is, specific frequencies at which high levels of sound within the plume will occur as a result of the multiple reflections of the sound between the plume base and surface.

This behavior may be induced by an actuator, that is, any means of generating sound, or of displacing the base of the plume in an oscillatory manner. In this embodiment the above described general acoustic generating system is additionally provided with an actuator which is configured to respond to the arrival of a reflected wave so as to reinforce the wave and induce resonant behavior. Specific examples of actuators that might be used to excite resonant behavior include underwater loudspeakers, foghorns or sirens, air valves that modulate the supply of air to the plume, and panels driven by compressed air that shake the plume.

An additional way in which the plume might be excited is to provide a valve on the supply to the bubble generator which is triggered by rising acoustic pressure in the plume, whereby the valve is caused to open by the arrival of a reflected wave releasing further gas bubbles at the base of the plume, or which causes an actuator to inject sound into the plume. As the sound pressure increases, the valve would open, hence increasing the sound pressure further, and conversely as the sound pressure drops the valve would close. This action would reinforce the resonance of the sound in the plume, leading to very high levels of sound.

Where the plume is generated along a line, by using bubble generation means and sound source having a linear geometry (eg a linear generator and source or a linear series of them), such that a sheet of bubbles is produced, this will lead to a barrier of high level sound such as would be very suitable for deflecting fish or deterring swimmers from entering an area. An underwater acoustic barrier can be constructed comprising an array of resonant underwater acoustic wave generators as above described.

The invention also provides a method of emitting sound of a known low frequency into a liquid medium comprising the steps of:

generating pressurised gas bubbles within the liquid, directing the bubbles into a plume, applying a varying pressure to the base of the plume of bubbles to modulate the plume of bubbles, characterised in that the varying pressure is applied by means of a low frequency sound source, preferably located adjacent to the outlet, whereby a source of low frequency sound waves is produced.

The method in preferably involves bubble generation by way of introduction of a pressurised gas to a bubble generation chamber and release of the gas from an outlet in the chamber in pulses or bubbles of a predetermined size and speed, the pulses or bubbles preferably being generated by means of a suitable interrupter device such as a valve or rotating sectored disc or the like.

As above, the method can be used as a method of transmission of long range low frequency sound signals underwater for sonar or the like or adapted for shallow water use to produce a method of generation of a resonant underwater acoustic wave, in which an actuator is used to induce a resonant wave generated by repeated reflection at the water surface and source, with the optional additional step that further pressurised gas bubbles are generated in response to rising acoustic pressure in the plume such as is caused by the arrival of a reflected wave, thereby reinforcing the resonant effect. Again, the method is particularly effective at generating an underwater barrier if modified to produce a sheet of bubbles.

BRIEF DESCRIPTION OF THE DRAWINGS

The invention will now be described by way of example only and with reference to FIG. 1 to 6 of the accompanying drawings, in which.

DETAILED DISCUSSION OF PREFERRED EMBODIMENTS

Figure 1:
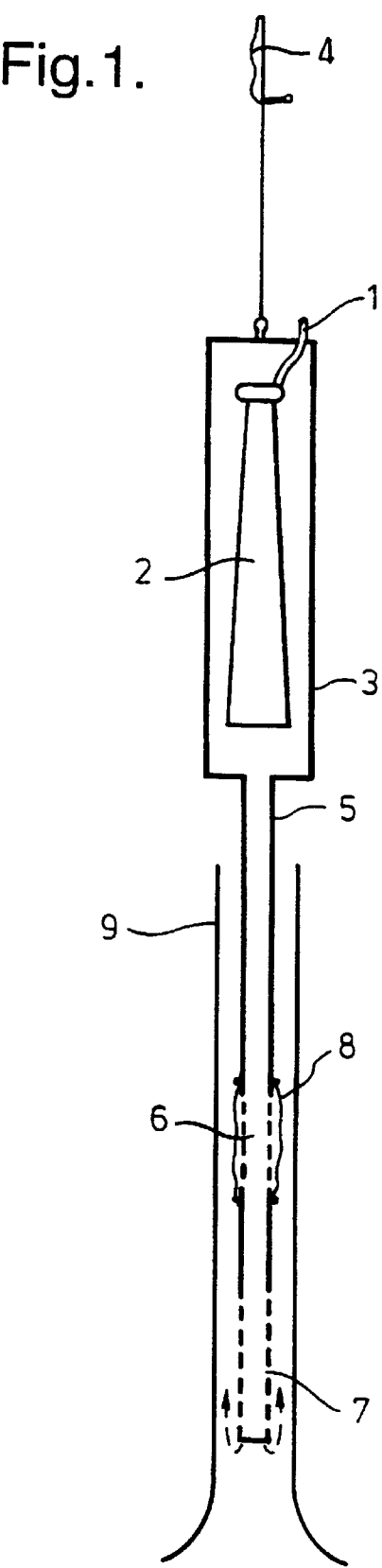
FIG. 1 is an illustration of a low-frequency acoustic underwater transmitter incorporating the principles of the invention.

The acoustic generating system of FIG. 1 comprises a source 1 of pressurised air or other suitable gas connected to the inlet of a foghorn 2. The source is connected to a valve (not shown) which is adapted to open and close at a frequency to form pulses of air capable of forming bubbles when passed into water. The foghorn is enclosed within a chamber 3 supported by a chain 4 of a hydrophone. The chamber has a downwardly pointing extension 5 which has two zones of sintered glass 6, 7. The first zone 6 is surrounded by a thin diaphragm 8 and the second zone 7 provides outlet holes to a surrounding coaxial open tube 9.

In use, pulsed air is passed into the foghorn and passes along chamber extension 5. A plume of bubbles emerges from the outlet holes in second zone 7 and exits from the upper end of the tube 9. The bubbles passing along the annular space between extension 5 and tube 9 are modulated by the movement of the diaphragm 8 caused by the pulsing air flow from the chamber 3.

In an alternative embodiment of the invention, a continuous stream of bubbles is caused to flow in a plume from a source of compressed gas such as air. Around the throat of the bubble plume is arranged a low frequency sound source in the form of a loudspeaker capable of delivering low frequency signals having an approximate range of 5 to 100 Hz. The loudspeaker acts on or "squeezes" the bubbles to create a plume radiating sound at a frequency equal to that of the loudspeaker.

Figure 2:
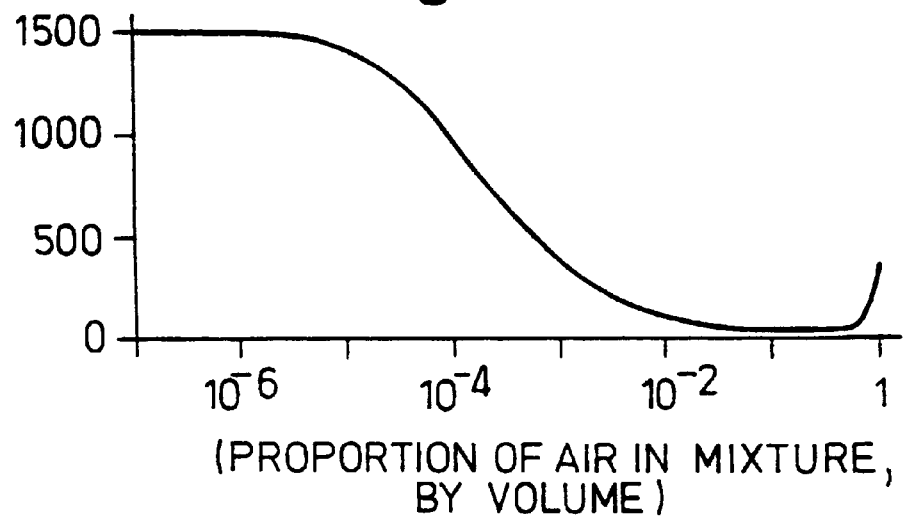
FIGS. 2 to 4 illustrate the acoustic behavior of a bubble plume which is utilised by a sound source in accordance with the invention.
Figure 3:
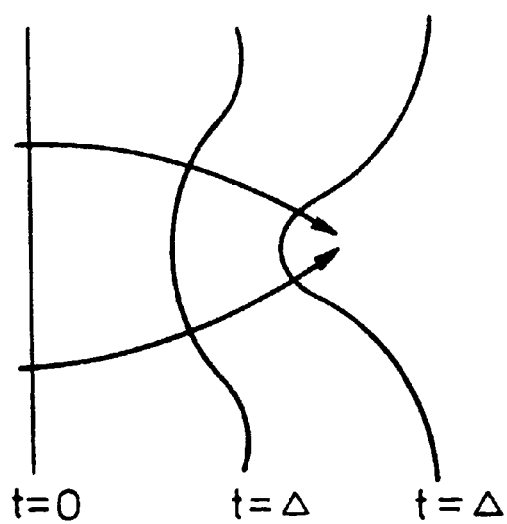

The principle of operation of the device illustrated in FIG. 1 and other similar embodiments of the invention may be described with reference to FIGS. 2 to 4 as follows. A bubble generator in the water is fed with a continuous flow of air or another gas. This is designed to form a plume of bubbles which will rise in the water under the effects of buoyancy. In some cases, it may be desired to form a near-horizontal plume and in this case the bubble generator may be pulled through the water at a speed where the rate of ascent of the bubbles is small when compared with the forward speed of the source. The plume diverges as it moves away from the bubble generator, typically at an opening angle of 7 degrees or so. Near to the generator, the plume will typically contain 5 to 10 percent by volume of air. Further from the generator, the proportion of air reduces rapidly as the plume diverges and as the air is dissolved into the water. Typically, at a distance along the plume of approximately 200 meters, the air is dissolved and the effective existence of the plume is terminated.

The principle of operation of the device depends on understanding the acoustic behavior of the plume. The speed of sound in a fluid is given by:

$$Cp=(B/p)$$

where B is the bulk modulus of the fluid, that is, a parameter that describes its compressibility, and p is its density. Increases in the density thus lead to decreases in the speed of sound within the fluid, and increases in bulk modulus (that is, reductions of the compliance of the fluid) lead to an increase in the speed of sound.

For a mixture of a gas and fluid, such as that in a bubble plume, the properties may usually be modelled as a composite of the properties of the two media. In the case of the plume, the density of the mixture is fairly constant; for 5% air in the water at the point of formation of the plume the density of the mixture is about 95% of that for water. However, the bulk modulus is greatly decreased (the compressibility is increased) by the compressibility of the air being added to the very low compressibility of the water (see FIG. 2).

Typical reductions are of the order of 0.1% or less and if this figure is inserted into the equation above it may be determined that the velocity of sound in the plume at its point of formation is typically 50 meters per second or less. This velocity increases along the plume in a manner which is approximately exponential, reaching the free water value as the plume terminates.

This behavior tends to trap the sound within the bubble plume. This feature of plumes may be described as follows. Consider a wave propagating both within and outside the plume. This is illustrated in FIG. 3. A short period of time later the wave front has become distorted. The portion of the wave within the plume is delayed relative to that outside the plume. It the normals to the wave front, representing the direction of propagation of sound energy, are drawn in, then it may be seen that the sound is being diffracted towards the axis of the plume and trapped, until it emerges at the end of the plume into the surrounding water.

The invention applies these properties to arrive at the previously unrecognised conclusion that plumes such as described herein may be utilised as acoustic transformers. The measure of impedance of a fluid to sound is its acoustic impedance in Rayls, given by the product of the density and speed of sound, pC. Air has a low acoustic impedance of 450 Rayls while water has a high acoustic impedance of $1.5 \times 10^7$ Rayls. The consequence of this is that small forces are required to generate large sound displacements in air, but that large forces are required to generate small displacements in water. Devices that are designed to create sound in air, such as loudspeakers, incorporate large displacements of a flexible system, while those that are designed for underwater use tend to be based on piezoelectric elements which are very stiff and whose displacements are relatively much smaller.

Additionally, for efficient and broadband generation of sound, the active area of the device must typically be large relative to wavelength. While this is rarely a problem if the medium is air, in water at a frequency of 100 Hz tile wave length is 15 meters. Hence existing transducers at these frequencies tend to be resonant and inefficient. The behavior of the bubble plume may be exploited to generate an efficient, broadband sound generator at lower frequencies which is of a much more manageable and practical size than would be necessary to overcome the above problems in a conventional transducer.

Figure 4:
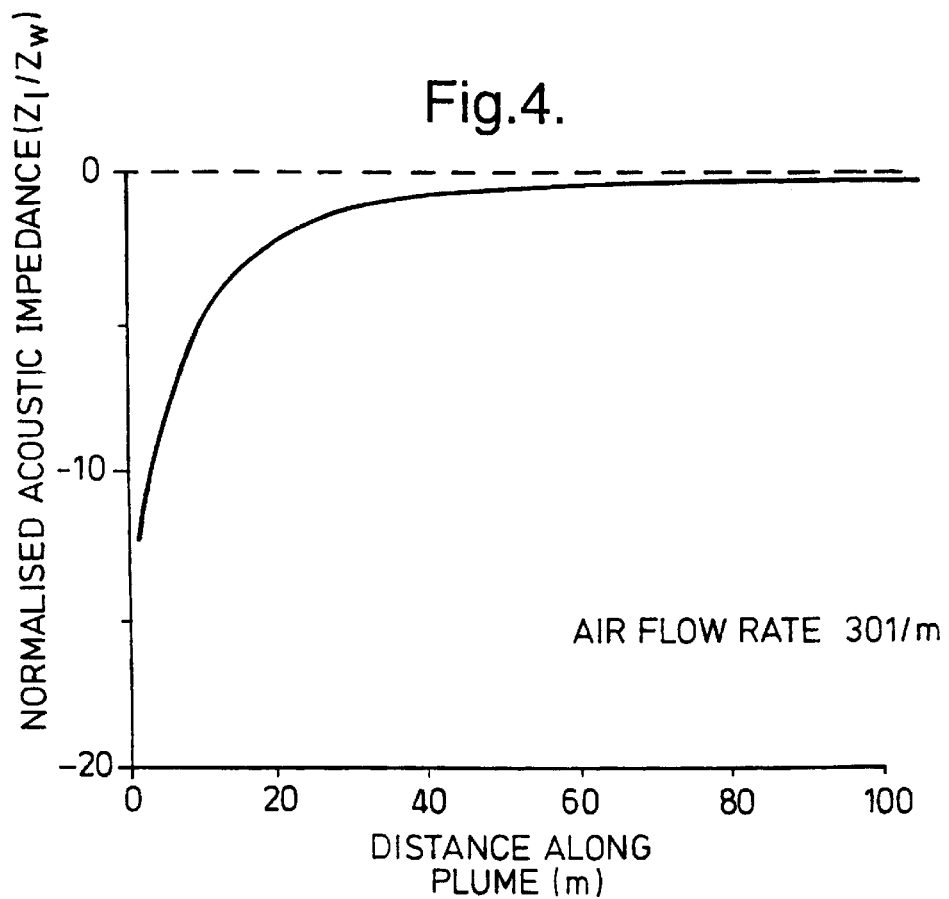

FIG. 4 illustrates the local acoustic impedance along the length of a bubble plume as a function of normalised acoustic impedance. It may be seen that near to the point of generation the impedance is very low, but that it approaches that of water at its end. The change in impedance is roughly constant per local wavelength of the sound. The plume therefore acts as a very efficient transformer. The effect is very similar to the horn or loudhailer in air. In practical terms, it means that low impedance sources of sound such as a conventional loudspeaker, suitably waterproofed, may be used to drive sound into the water surrounding the end of the plume. The source may also be a diaphragm which is displaced by an alternating flow of gas under pressure. In either case, the source may be positioned at a point in the plume whereby the local impedance of the plume matches its source impedance.

An additional feature of the plume is that as a consequence of the conservation of energy low pressures at the source, at high displacements, will translate to high pressures in the eater at the end of the plume, albeit at low displacements.

Figure 5:
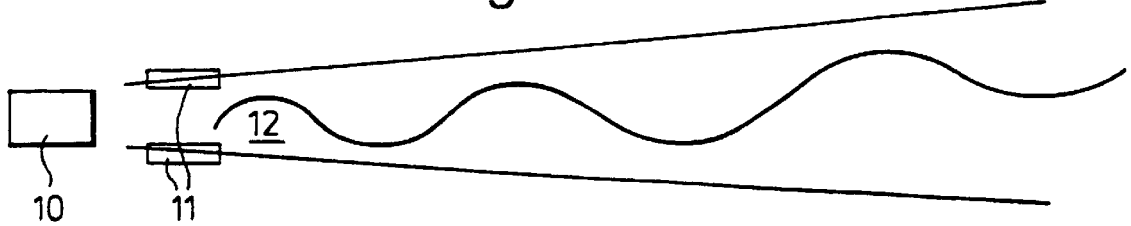
FIG. 5 is a schematic representation of a source and bubble plume combination in operation in water in accordance with the invention.

FIG. 5 illustrates typical implementation. A plume is generated by the bubble generator 10. The plume ascends through the water, dispersing and dissolving until the plume is terminated. A driver 11 is located at a portion of the plume 12 where the acoustical or mechanical impedance of the plume matches the internal impedance of the driver. Typically, this will be similar to a loudspeaker in air. Alternatively, a compliant air bag may be used as a driver, where changes in the volume of the air bag are caused by its being fed with air at a rate that is modulated by a control valve. Changes in local pressure caused by the driver propagate UP through the plume and radiate into the water at the point that the bubble plume disperses. Since the area of the radiating surface is large, in principle very low frequencies of sound, much below those of current systems, might be generated, and high efficiency should be retained. For efficient operation, the surface area of a source has to be of the order of a half wavelength in diameter. At 10 Hz this implies a structure 150 meters across; while this is a proposition of limited practicality for a conventional transducer of rigid structure, a bubble plume with a width of this value is much easier to generate.

Figure 6:
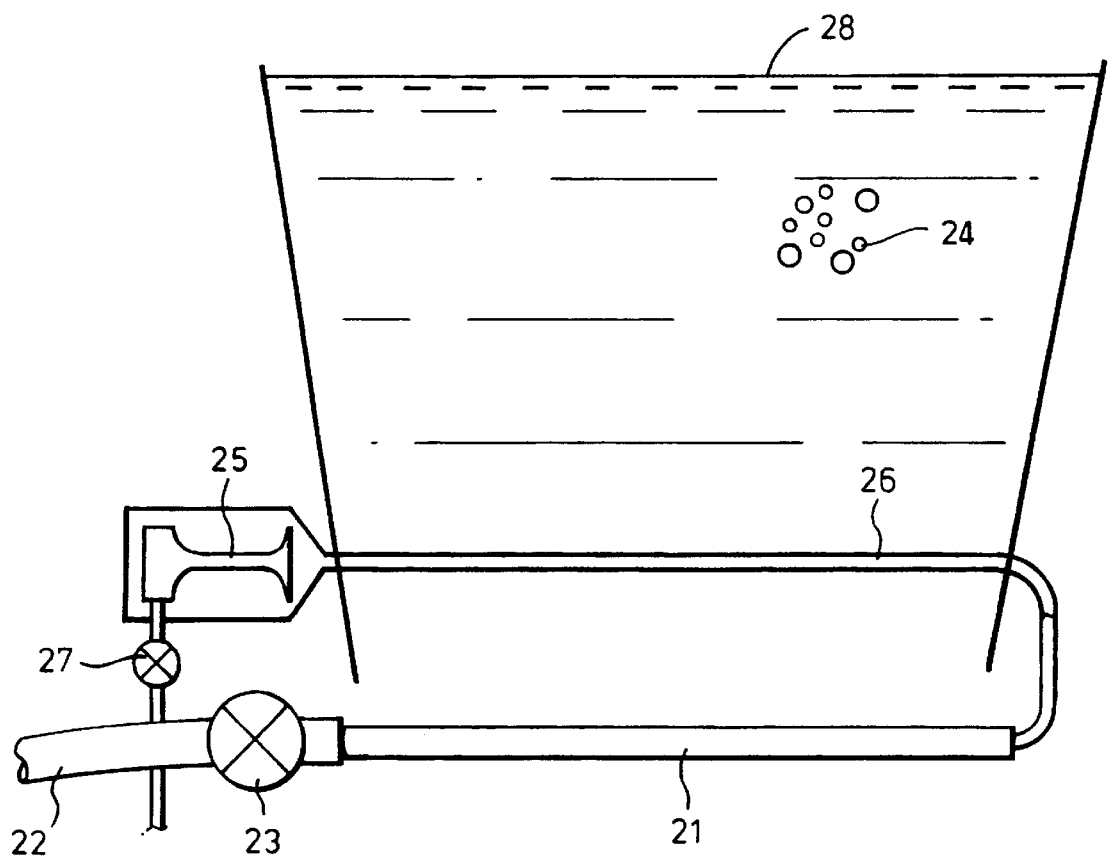
FIGS. 6 and 7a–c illustrate an acoustic resonant system for use in shallow water incorporating the principles of the invention.
Figure 7A:
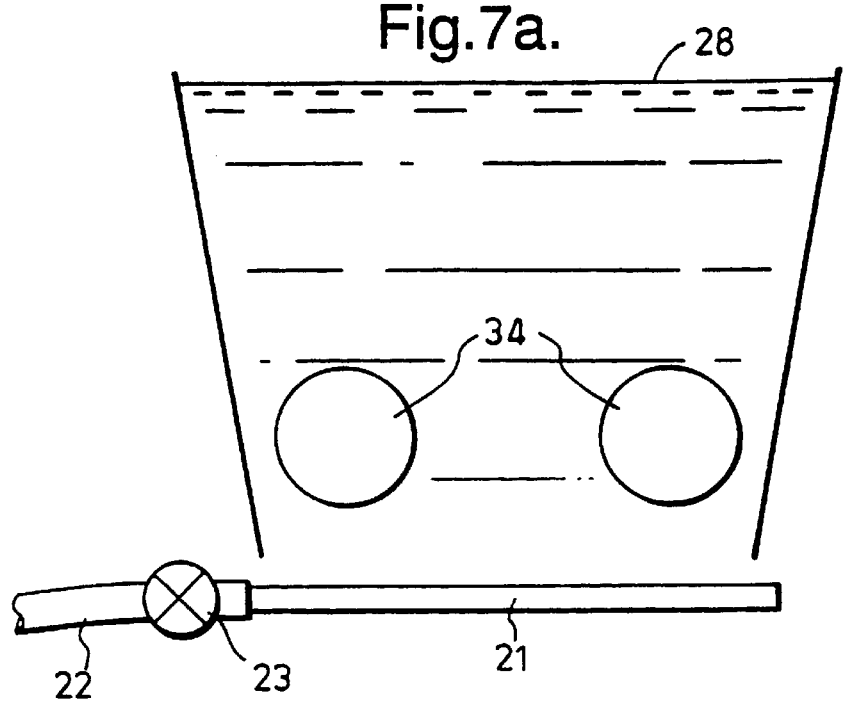

FIGS. 6 and 7 illustrate a device for shallow water, say a few meters or tens of meters deep, configured to operate as a resonant system created by repeated reflection from the water surface and the point of generation of the bubbles.

FIG. 6 illustrates a typical implementation of the system. A porous pipe 21 generates a plume of bobbles in the water.

It is fed with compressed air or gas via a feed pipe 22. The supply is controlled by means of a valve 23. The supply is controlled by means of a valve 23. It generates a sheet of bubbles 24 which rises to the water surface 28. An air horn 25 which may be fed by the same or another compressed air supply, and which is within an enclosure, generates sound which is conducted into a flexible tube 26, perhaps of rubber. The sound thus may couple into the bubble plume through the flexible tube generating high levels of sound in it. The air or gas exhausting from the flexible tube may be vented into the water or may be used to help generate the plume as shown. A further valve 27 enables the supply to the airhorn to be regulated.

Figure 7B:
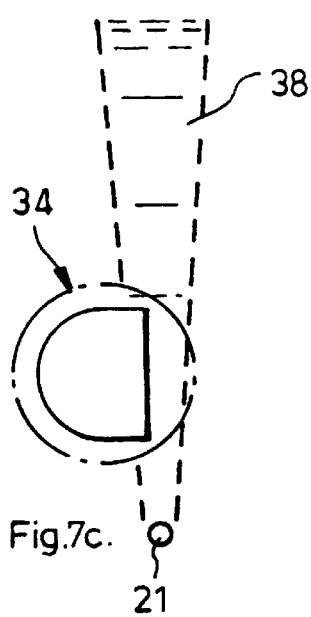
Figure 7C:
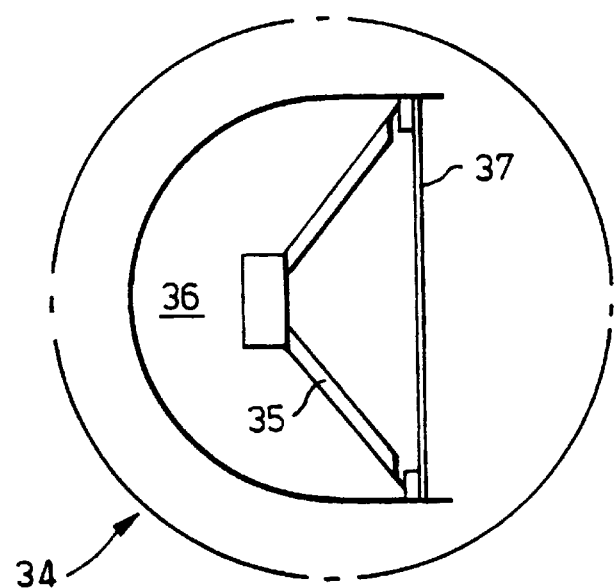

Another typical implementation is shown in FIG. 7. The same arrangement of compressed air or gas supply 22, valve 23 and porous pipe 21 is used to generate a plume of bubbles. In this case the sound in the plume is generated by providing one or more loudspeaker assemblies 34, which are shown in detail in FIG. 7c and consist of loudspeakers 35 similar to those used for hi-fi systems, which are within a waterproof enclosure 36. They are provided with a flexible diaphragm 37 which can displace to and fro, enabling the displacement that they generate, and hence the sound, to be conducted into the bubble plume.

The loudspeaker assemblies 34 are sited so that the diaphragm is within the bubble plume 38 (see FIG. 7b). The loudspeakers are driven by means of an electrical signal, possibly via a wire that connects the loudspeakers to one or more amplifiers and signal generators at the surface. The loudspeakers may hence be driven with a sinusoidal, swept sinusoidal or other signal.

Both of these implementations may be used to generate a high level of sound within the bubble plume, which will decay rapidly away from the plume. This may be used as an effective means of guiding fish, which will avoid the sound, or of deterring divers from entering an area.

We claim:

1. An acoustic generating system comprising:
   bubble generation means for forming pressurised gas bubbles,
   means for directing the bubbles in a plume from an outlet, and
   means for applying a varying pressure to the base of the plume of bubbles for modulating the plume of bubbles, wherein the means for applying a varying pressure comprises a single low frequency sound source whereby sound waves having a frequency in the range of 5–1000 Hz are produced.

2. An acoustic generating system in accordance with claim 1 wherein the low frequency sound source is located adjacent to the outlet.

3. An acoustic generating system in accordance with claim 1 wherein the bubble generation means comprises means for the introduction of a pressurised gas to a chamber and pulse generation means to control release of the gas from the outlet in pulses or bubbles of a predetermined size and speed.

4. An acoustic generating system in accordance with claim 3 wherein the pulse generation means comprises a suitable interrupter device.

5. An acoustic generating system in accordance with claim 4 wherein the interrupter device is a valve or rotating sectored disc.

6. A low frequency sound transmitter for the generation of signals underwater comprising an acoustic generating system in accordance with claim 1.

7. A resonant underwater acoustic wave generator comprising an acoustic generating system in accordance with claim 1 and further provided with an actuator which is configured to respond to the arrival of a reflected wave so as to reinforce the wave and induce resonant behavior.

8. A resonant underwater acoustic wave generator in accordance with claim 7 further comprising a valve on a supply to the bubble generation means which is triggered by rising acoustic pressure in the plume, whereby the valve is caused to open by the arrival of a reflected wave releasing further gas bubbles at the base of the plume.

9. A resonant underwater acoustic wave generator in accordance with claim 7 comprising bubble generation means and sound source having a linear geometry such that a sheet of bubbles is produced.

10. An underwater acoustic barrier comprising an array of resonant underwater acoustic wave generators in accordance with claim 7.

11. A method of emitting sound of a known low frequency into a liquid medium comprising the steps of:
    generating pressurised gas bubbles within the liquid,
    directing the bubbles into a plume,
    applying a varying pressure to the base of the plume of bubbles to modulate the plume of bubbles, wherein the varying pressure is applied by means of a single low frequency sound source whereby sound waves having a frequency in the range of 5–1000 Hz are produced.

12. The method in accordance with claim 11 wherein bubble generation is achieved by way of introduction of a pressurised gas to a bubble generation chamber and release of the gas from an outlet in the chamber in pulses or bubbles of a predetermined size and speed.

13. The method in accordance with claim 11 wherein the pulses are generated by means of a suitable interrupter device.

14. A method of transmission of low frequency sound signals underwater comprising the use of the method in accordance with claim 11.

15. A method of generation of a resonant underwater acoustic wave, comprising the method of claim 11 in which an actuator is used to induce a resonant wave.

16. The method in accordance with claim 15 in which further pressurised gas bubbles are generated in response to rising acoustic pressure in the plume, thereby reinforcing the resonant effect.

17. An acoustic generating system for generating an acoustic signal in water, said system comprising:
    a source of pressurized gas with a gas outlet underwater, said gas forming pressurized gas bubbles in a plume from said outlet; and
    a loudspeaker providing a single frequency acoustic signal in the form of a varying pressure applied to the base of the plume of bubbles for modulating the plume of bubbles, wherein the loudspeaker comprises a single low frequency sound source whereby sound waves having a frequency in the range of 5–1000 Hz are produced.

18. A method of emitting sound of a known low frequency into a liquid medium comprising the steps of:
    generating pressurised gas bubbles at an outlet within the liquid forming a plume of gas bubbles; and
    applying a varying pressure to the base of the plume of bubbles to modulate the plume of bubbles, wherein the varying pressure is applied by a single low frequency sound source whereby sound waves having a frequency in the range of 5–1000 Hz are produced.

* * * * *